United States Patent
Avery, III

(10) Patent No.: US 9,181,974 B1
(45) Date of Patent: Nov. 10, 2015

(54) SUCTION CUP ATTACHMENT DEVICE

(71) Applicant: John Leonard Avery, III, Colfax, NC (US)

(72) Inventor: John Leonard Avery, III, Colfax, NC (US)

(73) Assignee: AVERY AEROSPACE CORPORATION, Colfax, NC (US)

( * ) Notice: Subject to any disclaimer, the term of this patent is extended or adjusted under 35 U.S.C. 154(b) by 0 days.

(21) Appl. No.: 14/605,133

(22) Filed: Jan. 26, 2015

(51) Int. Cl.
*A47G 1/17* (2006.01)
*F16B 47/00* (2006.01)

(52) U.S. Cl.
CPC ............. *F16B 47/003* (2013.01); *A47G 1/17* (2013.01); *F16B 47/00* (2013.01); *C09J 2201/606* (2013.01)

(58) Field of Classification Search
CPC ....... F16B 47/003; F16B 47/00; F16M 13/02; A47G 1/17; B23B 3/06; B23B 3/10; C09J 2201/606
USPC ...................... 248/205.3, 205.5, 206.2, 205.4
See application file for complete search history.

(56) References Cited

U.S. PATENT DOCUMENTS

| | | | |
|---|---|---|---|
| 276,336 A | 4/1883 | Baumerster | |
| 435,752 A | 9/1890 | Ingersoll | |
| 1,839,694 A | 1/1932 | Nelson | |
| 1,859,893 A | 5/1932 | Ritz-Woller | |
| 2,055,397 A | 9/1936 | Zaiger | |
| 2,432,719 A | 12/1947 | Braun | |
| 2,451,194 A | 1/1948 | Braun | |
| 4,842,912 A * | 6/1989 | Hutter, III | B29C 65/02 156/247 |
| 5,044,852 A | 9/1991 | Sweeney | |
| 5,275,367 A * | 1/1994 | Frye | F16B 47/003 248/205.3 |
| 6,406,407 B1 * | 6/2002 | Wiedmann | A63B 5/20 482/81 |
| 6,478,271 B1 * | 11/2002 | Mulholland | F16B 47/00 248/205.8 |
| 7,690,609 B2 | 4/2010 | Akai | |
| 8,261,937 B2 * | 9/2012 | Bodziak | B42D 5/006 206/39.3 |
| 2009/0057510 A1 * | 3/2009 | Orban | F16B 47/00 248/205.4 |
| 2010/0252709 A1 * | 10/2010 | Weng | F16B 47/00 248/304 |
| 2012/0145847 A1 * | 6/2012 | Wang | A47G 1/17 248/205.3 |
| 2012/0308763 A1 * | 12/2012 | Chen | B32B 3/06 428/78 |

FOREIGN PATENT DOCUMENTS

TW M380071 U1 * 5/2010 ............. A47G 1/16

* cited by examiner

*Primary Examiner* — Anita M King

(57) ABSTRACT

A device to semi-permanently attach suction cup mounts that previously lost functionality is provided. Further, the device provides attachment without marring a mounting surface, or substrate. The present invention consists of a thin barrier preferably metal foil of circular shape with a pressure sensitive adhesive on one side. An additional adhesive is provided to apply between the barrier assembly and a suction cup. This structural barrier assembly provides a cost effective way to make use of nonfunctioning suction cup mounts or mounted devices without replacing the mount or device.

9 Claims, 4 Drawing Sheets

SUCTION CUP ATTACHMENT DEVICE

CROSS-REFERENCE TO RELATED APPLICATIONS

This application claims the benefit of PPA Ser. No. 62/029,711, filed 2014 Jul. 28 by the present inventor.

FEDERALLY SPONSORED RESEARCH

Not Applicable

SEQUENCE LISTING OR PROGRAM

Not Applicable

BACKGROUND OF THE INVENTION

1. Field of Invention

The present invention relates generally to suction cups and, more particularly, to a device that retains suction cup attachments in a semi-permanent manor.

2. Prior Art

Suction cups can be found in nature on animals such and octopuses and squids. Artificial suction cups may have been created and used by humans as far back as the 3rd century, BC. Suction cups for use in temporarily securing devices are well known in the art. A portable bracket made use of a suction base in around 1882. See U.S. Pat. No. 276,336 (Baumeister). A hook attached to a suction cup was conceived in around 1888. See U.S. Pat. No. 435,752 (Intersoll). In around 1931, they were put to use holding notes in place. See U.S. Pat. No. 1,839,694 (Nelson and Bahr). Although suction cups have varied throughout history, the basic modern shape is an axisymmetric disc with a concave lower surface and a convex upper surface. A boss of some sort is usually molded into the center of the convex side to provide an attachment point. To improve the holding strength or duration of the suction cup's adherence, variations on this design have been tried. See U.S. Pat. No. 2,055,397 (Zaiger). Non-invasive attachments to rough surfaces such as automobile dashboards have also been attempted through the use of adding gels to the bottom surface of the cup. See U.S. Pat. No. 7,690,609 (Akai). Other designs have tried to mitigate air entering the envelope between the lower concave and mounting surfaces by storing a mild sealing agent within suction cup and having it flow onto contact edges of the disc as it is being affixed to a surface. See U.S. Pat. No. 1,859,893 (Ritz-Woller). Still other designs of suction cups exist that contain un-activated adhesive within the boss. Once activated, the adhesive bonds the bottom of the cup to a mating surface for a permanent bond. The mechanics of holding the cup in place by means of suction is only required while the adhesive is setting. This idea of using a suction cup to temporarily hold an adhesive fastener while curing may have use in industrial applications, although permanent bonding of a suction cup or suction fastener is inappropriate if the mounting surface is to be undamaged. See U.S. Pat. No. 2,432,719 (Braun), U.S. Pat. No. 2,451,194 (Braun) and U.S. Pat. No. 5,044,852 (Sweeney).

Suction cups made of modern elastomer or rubber have been used successfully to attach a variety of components to smooth surfaces in the households and vehicles. When these suction cups are newly manufactured, their strength and duration of attachment is adequate for many lightweight mounting applications. However, the performance of all suction cups diminishes with their age. Contact surfaces become scratched and their shapes become distorted. After a certain amount of degradation, they become completely useless.

3. Objects and Advantages

It is possible to permanently attach a worn out suction cup devices using an appropriate adhesive, however, damage will occur to the substrate or mounting surface. One solution to this problem, and the object of this invention, is an intermediate barrier to which a worn out suction cup can be bonded. This barrier is then attached to a desired surface using a semi-permanent, pressure sensitive adhesive. The barrier is flexible enough to conform to the bottom side of the suction cup as well as smoothly lay against a mounting surface. The edge of this barrier extends radially outward, well beyond the edge of the compressed suction cup to mitigate peel. The major advantage of this solution is that it restores the function of a worn out suction cup or suction cup mount without damaging the mounting surface. It will work to attach a suction mount to any smooth surface that that does not need frequent removal. The barrier device can be made and sold for a much lower cost than purchasing a replacement suction cup mount.

Applicant's assignee manufactures kits to semi-permanently affix worn out suction cup mounted products using a barrier and liquid and pressure sensitive adhesives. For many applications where frequent removal of the suction cup mount is not needed, this can be a cost-effective means to utilize old mounts, saving countless from entering landfills.

SUMMARY OF INVENTION

The present invention provides a means of semi-permanently attaching a worn out or damaged suction cup mount to a surface using a structural configuration that allows for a reliable bond without damaging the mounting surface.

The preferred embodiment of the invention consists of a thin aluminum barrier that will conform to either the concave surface of a suction cup or the shape of a mounting surface. This round disc should extend well past the outer edge of the suction cup once installed to mitigate peeling from the mounting surface, or substrate. The preferred material of the barrier is aluminum, however, any material with adequate strength and the ability to bond the suction cup using adhesives or glue with minimal preparation will suffice. The side of the barrier not in contact with the suction cup is affixed to the mounting surface, or substrate, using a pressure sensitive adhesive that is part of the barrier assembly. The barrier can be bonded to a suction cup before affixing it to the mounting surface if the object being mounted contains multiple suctions cups. This eases locating multiple barriers onto the mounting surface within proper relation to each other. If a single suction cup is to be mounted, the barrier can be affixed to the mounting surface before bonding the suction cup. Surface preparation of the barrier with an abrading pad, sandpaper, grit blasting, chemical etching or otherwise may be required for proper bonding of the suction cup.

These and other features and advantages of the present invention will be readily apparent to those of skill in the art from a review of the following detailed description along with the accompanying drawing figures.

DETAILED DESCRIPTION OF THE PREFERRED EMBODIMENTS

Figure 1:
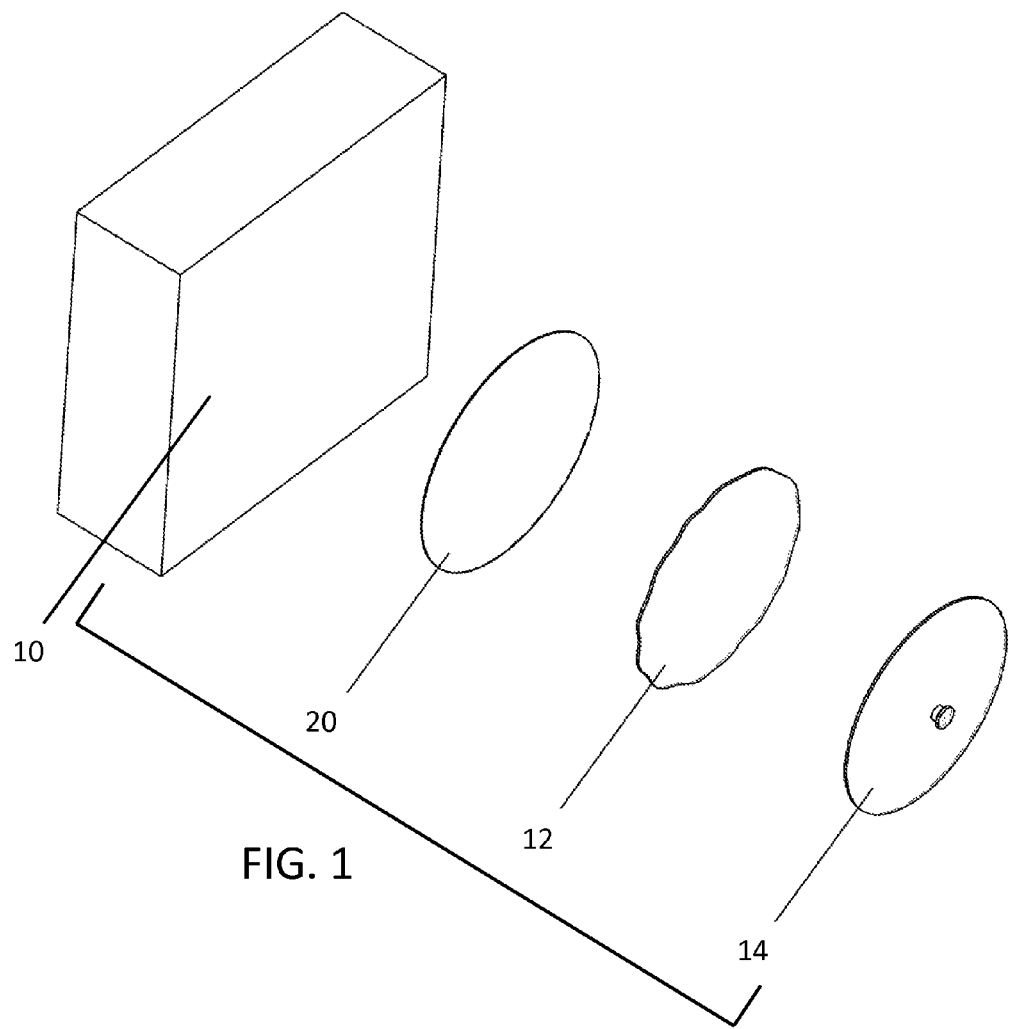
FIG. 1 is an exploded perspective view of the present invention receiving a suction cup and mounting surface.
Figure 2:
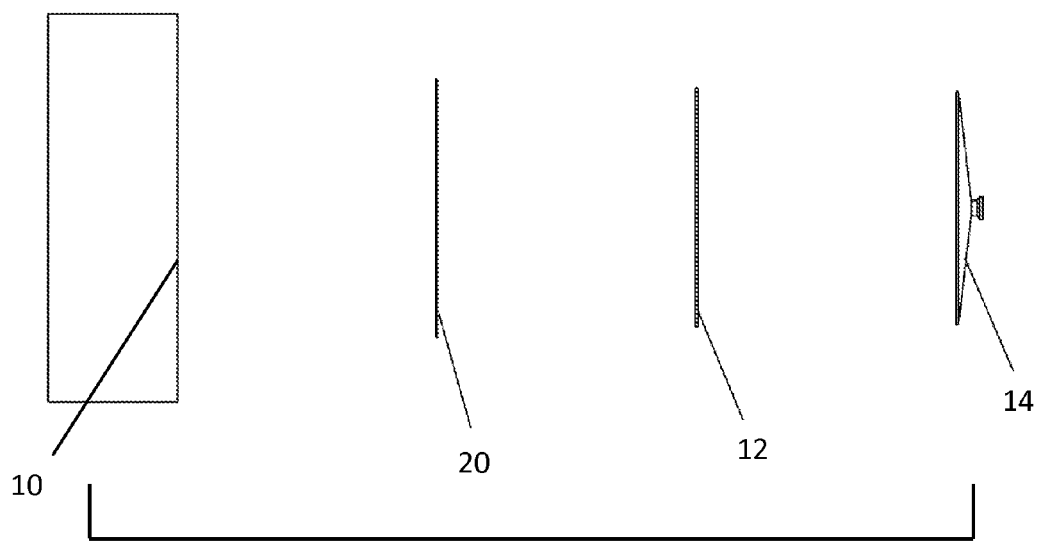
FIG. 2 is an exploded side view of the present invention receiving a suction cup and mounting surface.
Figure 3:
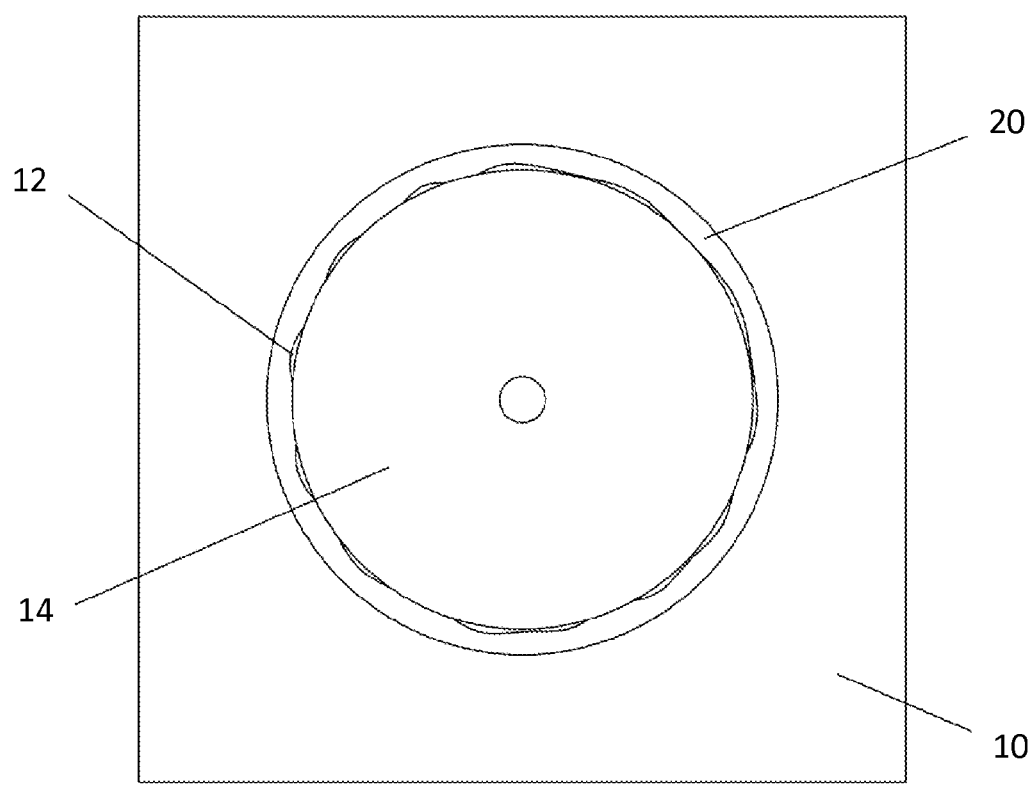
FIG. 3 is a plan view of the present invention receiving a suction cup and mounting surface.
Figure 4:
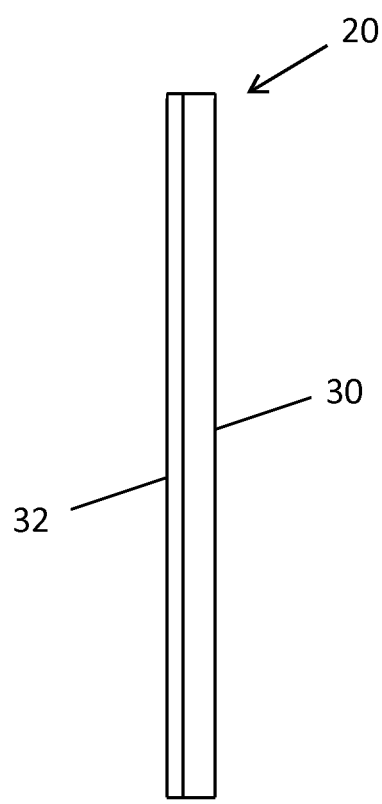
FIG. 4 is a detailed side view of the barrier and pressure sensitive adhesive assembly, referred to as the barrier assembly.

So that the objects and advantages of the present invention may be understood more fully, reference is made to FIGS. 1 through 4. The FIGS. 1 through 3 show the present invention receiving a suction cup 14 and being affixed to a mounting surface 10. FIG. 4 is a detailed side view of the barrier assembly 20 showing a barrier 30 made of a thin sheet and a pressure sensitive adhesive 32. The preferred embodiment of the barrier 30 is a circular aluminum disc of diameter larger than that of the compressed suction cup 14 to provide a peel resistant attachment to the mounting surface 10. The adhesive 12 is a fast drying contact type in liquid form, before curing. The structural barrier assembly consists of the pressure sensitive adhesive 32, the barrier 30 and the adhesive 12. The barrier assembly 20 consists of the pressure sensitive adhesive 32 and the barrier 30.

The barrier assembly 20 is bonded to the suction cup 14 using the liquid adhesive 12. After bonding, the covering that protects the pressure sensitive adhesive is removed and the entire assembly is then located and pressed onto the mounting or substrate surface. All surfaces and edges of the barrier assembly 20 are firmly worked onto the mounting surface 10 to eliminate any air bubbles, voids or wrinkles.

Alternately, the barrier assembly 20 can be affixed to the mounting surface first, using firm pressure to work out any air bubbles, voids or wrinkles, and to adhere the pressure sensitive adhesive 32 to the mounting surface 10. The suction cup 14 is then bonded to the barrier assembly 20 using the liquid adhesive 12. Once the adhesive layers have fully cured, the entire bonded assembly can be used to support a suction-cup-mounted product.

An additional embodiment is the same as the preferred except that the circular barrier assembly 20 described above is replace by a flat ring, or circular disc with a round or otherwise relief hole at its center. The outer edge of the circular disc must extend out past the edge of a compressed suction cup in order to mitigate peel.

There are endless possibilities as to the planform shape and material to make the barrier 30. Also, the adhesive 12 can vary from fast drying contact adhesive, to other glues, to a pressure sensitive adhesive.

The forgoing is considered as illustrative only to the principal of the invention. Further, since numerous changes and modification will occur to those skilled in the art, it is not desired to limit the invention to the exact construction and operation shown and described above, and accordingly, all suitable modifications and equivalents may be resorted to falling within the scope of the invention.

What is claimed is:

1. A suction cup attachment device consisting of a structural barrier assembly, comprising:
   a. a barrier, flexible and large enough to extend radially beyond that of an attached suction cup edge;
   b. a layer of pressure sensitive adhesive on one of two sides of said barrier as a means of attaching to a mounting surface;
   c. a layer of adhesive on the second of two sides of said barrier as a means of connecting to a suction cup.

2. The suction cup attachment device consisting of the structural barrier assembly of claim 1, wherein the barrier is metal.

3. The suction cup attachment device consisting of the structural barrier assembly of claim 1, wherein the barrier is plastic.

4. The suction cup attachment device consisting of the structural barrier assembly of claim 1, wherein the barrier is a flat circular disc.

5. The suction cup attachment device consisting of the structural barrier assembly of claim 1, wherein the barrier is a flat circular ring.

6. The suction cup attachment device consisting of the structural barrier assembly of claim 1, wherein the barrier is a flat sheet of arbitrary shape.

7. The suction cup attachment device consisting of the structural barrier assembly of claim 1, wherein the barrier has non-planar major surfaces and is of arbitrary shape.

8. A method for semi-permanently securing a suction cup to a mounting surface, or substrate, without piercing or materially marring the substrate, comprising the steps of:
   a. providing a flexible barrier between said suction cup and said substrate;
   b. providing a pressure sensitive adhesive on said barrier;
   c. providing an adhesive for application between said barrier and said suction cup;
   d. positioning and pressing said barrier with said pressure sensitive adhesive to the substrate; and
   e. applying said adhesive to said suction cup or said barrier or both, and pressing the said suction cup against the exposed side of said barrier until said suction cup is compressed.

9. A method for semi-permanently securing a suction cup to a mounting surface, or substrate without piercing or materially marring the substrate, comprising the steps of:
   a. providing a flexible barrier between said suction cup and said substrate;
   b. providing a pressure sensitive adhesive on said barrier;
   c. providing an adhesive for application between said barrier and said suction cup;
   d. applying said adhesive to said suction cup or said barrier or both, and pressing the said suction cup against the exposed side of said flexible barrier until said suction cup is compressed; and
   e. positioning and pressing said barrier with said pressure sensitive adhesive and said adhesive and said suction cup to the substrate.

* * * * *